April 8, 1969  R. ROSENBERG  3,437,400
ELECTRO-OPTIC LIGHT DEFLECTION APPARATUS
Filed April 19, 1965  Sheet 1 of 3

INVENTOR
R. ROSENBERG
BY Lucian C. Canepa
ATTORNEY

United States Patent Office 3,437,400
Patented Apr. 8, 1969

3,437,400
ELECTRO-OPTIC LIGHT DEFLECTION
APPARATUS
Robert Rosenberg, Summit, N.J., assignor to Bell Telephone Laboratories, Incorporated, New York, N.Y., a corporation of New York
Filed Apr. 19, 1965, Ser. No. 448,982
Int. Cl. G02f 1/26
U.S. Cl. 350—150                                15 Claims

ABSTRACT OF THE DISCLOSURE

An array of zero degree z-cut cuboidal electro-optic blocks, each oriented with respect to reference x, y, and z axes and each rotated 90° with respect to the preceding block, is arranged such that light incident on said array at approximately 45° with respect to the x and y axes is internally reflected within said blocks and upon the application of an electric field parallel to the z-axis is deflected at each reflection with successive deflections being additive.

---

This invention relates to the direction of radiant energy and more particularly to apparatus for selectively deflecting an incident light beam as a linear function of an applied control voltage.

Various types of optical systems in which electro-optic elements are utilized to accomplish switching, are known. In such systems the desired switching action may be achieved by positioning an electro-optic device between crossed polarizers, the device being arranged to selectively rotate the plane of polarization of light incident thereon. Alternatively, switching may be accomplished in such systems by means of an electro-optic device that is adapted to selectively deflect the propagation vector of a light beam directed thereat.

An object of the present invention is the improvement of arrangements for redirecting radiant energy.

More specifically, an object of this invention is a novel apparatus for selectively deflecting the propagation vector of an incident light beam.

Another object of the present invention is an efficient solid-state deflection apparatus which is characterized by simplicity of design, ruggedness of construction and reliability.

These and other objects of the present invention are realized in a specific illustrative embodiment thereof which comprises an integral array of zero degree z-cut cuboidal electro-optic blocks oriented with respect to x, y and z axes. Each block is a single uniaxial crystal made of a linear electro-optic material, such as potassium dihydrogen phosphate, and is arranged such that its optic axis is parallel to the z axis. A control voltage is applied along the z axis of each block, whereby so-called fast and slow phase velocity axes appear in the x-y plane of each block at 45° to the edges thereof. In addition, each block is rotated 90° about the z axis with respect to its adjacent blocks, so that there is an alternation of the orientation of fast and slow axes in successive blocks.

An incident collimated light beam is directed at the described array via a right angle entry-exit prism. In particular, the beam is polarized in a plane defined by the x and y axes and is directed at the prism perpendicular to the z axis along a path disposed at 45° to the x and y axes. As the beam propagates through the array, it experiences successive refractions and total internal reflections. At each reflecting boundary and across each refracting interface, the beam is deflected from the path it would follow in the absence of an applied voltage. These deflections are additive. In other words, each deflection contributes to the ultimate deflection that is characteristic of the propagation vector of the beam as it emerges from an exit face of the prism.

The amount by which the incident beam is deflected by the illustrative apparatus is a linear function of the applied control voltage. Moreover, the direction of deflection of the beam is a function of the polarity of the applied voltage.

It is a feature of the present invention that a light beam be directed at a linear electro-optic block along a path perpendicular to the optic axis thereof and that a control voltage be applied to the block to establish an electric field parallel to the optic axis.

It is another feature of this invention that a lighter deflection apparatus include an aintegral array of linear electro-optic blocks and that each block be oriented 90° about its optic axis with respect to the blocks adjacent thereto.

A complete understanding of the present invention and the above and other objects, features and advantages thereof may be gained from a consideration of the following detailed description of a specific illustrative embodiment thereof presented hereinbelow in connection with the accompanying drawing, in which.

Figure 1:
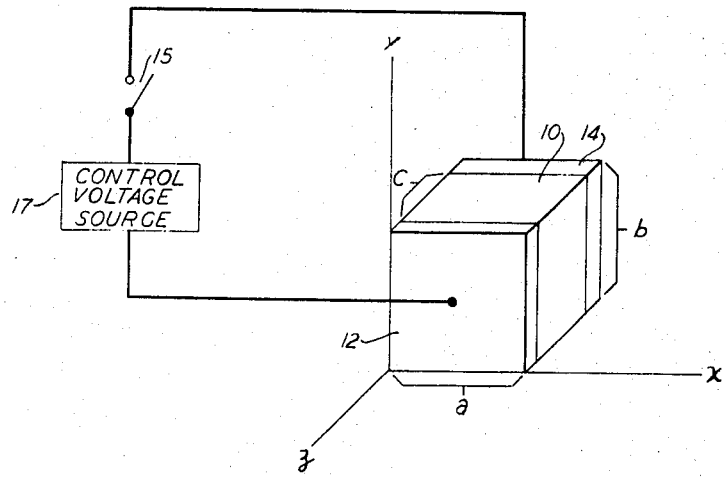
FIG. 1 shows a block of linear electro-optic material having electrodes affixed thereto.

Referring now to FIG. 1, there is shown a cuboidal block 10 of a linear electro-optic material such as, for example, potassium dihydrogen phosphate ($KH_2PO_4$ or KDP). Actually, any material which is a member of the crystal class Tetragonal; $\overline{4}2m$ (Hermann-Mauguin notation) is a suitable constituent of the deflective apparatus to be described herein. Moreover, although emphasis herein will be directed to this particular crystal class (specifically to the member KDP thereof) it is to be understood that materials selected from the classes Cubic; 23 and $\overline{4}3m$ are also suitable for inclusion in illustrative embodiments of the principles of the present invention. (The three specified crystal glasses are described in an article by W. P. Mason entitled "Optical Properties and the Electro-Optic and Photoelastic Effects in Crystals Expressed in Tensor Form," which appears in the April 1950 issue of the Bell System Technical Journal at pages 161–188.)

The KDP cuboidal block or element 10 shown in FIG. 1 is assumed to be surrounded by air. The element 10 is a single crystal which is optically uniaxial. The optic axis of the element 10 is parallel to the z axis indicated in FIG. 1. In addition, the indicated x and y axes are parallel to the equal edges $a$ and $b$ of the cuboidal element 10. Advantageously, the edge $c$ is equal to or greater than $a/\sqrt{2}$.

Affixed to the block 10 of FIG. 1 are two electrodes 12 and 14 which are connected via switch 15 to a source 17 of control voltage. It is noted that the electrodes 12 and 14 respectively contact the two faces of the block 10 which are parallel to the plane defined by the $x$ and $y$ axes. When the switch 15 is closed the electrodes 12 and 14 are effective to establish an electric field therebetween in the block 10 in a direction parallel to the $z$ axis.

Figure 2:
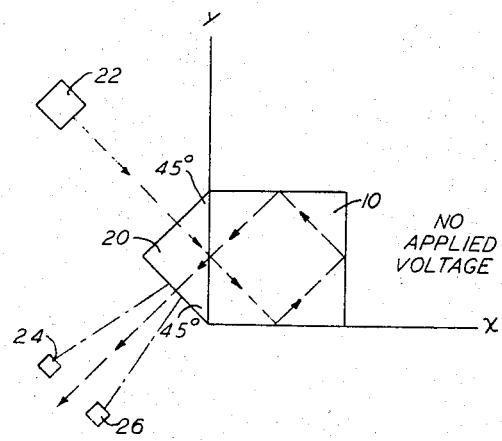
FIG. 2 depicts a block of linear electro-optic material in combination with a prism and indicates the path followed by an incident beam in the absence of an applied electric field.

For the moment assume that the switch 15 shown in FIG. 1 is left in its depicted open-circuit position. Assume further that an isosceles right angle entry-exit prism 20 is affixed to the block 10, as shown in FIG. 2. (Illustratively, the prism 20 may also be made of a linear electro-optic material such as KDP.) In the absence of an applied electric field, an incident collimated light beam emitted by a light source 22 follows a normal or no-voltage path through the elements 10 and 20. This path is represented in FIG. 2 by a dashed line and arrowheads which indicate the propagation vector of the incident light. The incident light is directed perpendicular to the $z$ axis along a path disposed at 45° to the $x$ and $y$ axes. Advantageously the light emitted by the source 22 is polarized in the plane defined by the $x$ and $y$ axes. If the elements 10 and 20 are made of the same material (or of different materials having identical indices of refraction) the beam is not refracted as it crosses the interface between the prism 20 and the block 10. Furthermore, at each of the three depicted reflecting boundaries between the element 10 and the surrounding medium, the angle of reflection of the propagating light beam equals the angle of incidence thereof. Hence the beam leaves the prism 20 at exactly 90° with respect to the assumed incident path that extends between the source 22 and the entry face of the prism 20.

The light beam path shown in FIG. 2 is indicated as passing between two light sensors or receivers 24 and 26. In the no-voltage case the incident beam is considered to traverse a reference or undeflected path between the receivers 24 and 26. On the other hand, in the presence of an applied field, and in accordance with the principles of the present invention, the beam can be selectively deflected up or down to impinge upon one or the other of the receivers 24 and 26.

When a control voltage is applied to the electrodes 12 and 14 shown in FIG. 1, so-called fast and slow phase velocity axes appear or are distinguished in the block 10. These axes appear in a plane parallel to that defined by the $x$ and $y$ axes. More specifically, the block 10 is so cut that the fast and slow axes appear at 45° to the edges thereof. (The block 10 is said to be zero degree $z$-cut.) This particular orientation of the fast and slow axes is shown in FIG. 3 wherein the axes are represented by dot-dash lines.

Figure 3:
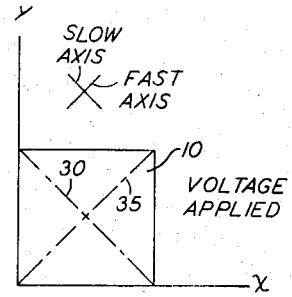
FIG. 3 illustrates the orientation of the fast and slow axes in a block of linear electro-optic material in the presence of an applied field.

As indicated by the crossed-line symbol immediately above the block 10 of FIG. 3, the axis 30 is assumed to be a relatively slow phase velocity one and the line 35 is assumed to represent a relatively fast phase velocity axis. This condition obtains for one polarity of the applied control voltage. For the opposite polarity the fast and slow axes are respectively interchanged. In addition, it is clear that if the block 10 is rotated 90° about the $z$ axis (which is perpendicular to the plane of the paper of FIG. 3) the fast and slow axes are also interchanged from the orientation shown in FIG. 3.

It is well known that the phase velocity of light in a medium whose index of refraction is $n$ is $$v_{phase} = c/n \qquad (1)$$

where $c$ is the velocity of light in a vacuum. In the absence of an applied electric field, the block 10 shown in FIG. 1 is characterized by an index of refraction $n_0$ for every plane wave whose propagation vector and electric field vector both lie in the $x$-$y$ plane. For such waves, the refractive index is thus direction-insensitive in the absence of an applied electric field. However, when an electric field parallel to the $z$ axis is established in the block 10, the aforementioned fast and slow phase velocity axes appear therein. The index of refraction for propagation along a fast axis is less than that for propagation along a slow axis. In particular, the index of refraction for propagation along the slow axis is $n_0 + n_0\delta$ and that for propagation along the fast axis is $n_0 - n_0\delta$, where $n_0\delta$ is the change in index produced by the applied field. Hence, a light beam will propagate along a fast axis at a higher phase velocity that it will propagate along a slow axis, as is apparent from relationship (1).

In accordance with the principles of this invention, the direction-sensitive nature of the indices of refraction within the block 10 of FIG. 3 is taken advantage of by propagating light generally parallel to the fast and slow axes thereof. Consequently, as will be seen clearly from the description hereinbelow of FIG. 4, the angles of incidence and reflection at each reflecting boundary are no longer equal, as the were in the no-voltage FIG. 2 example. Also, if adjacent blocks are oriented 90° about the $z$ axis with respect to each other, it will be seen that a refraction occurs as the light propagates across the interface between adjacent blocks.

Figure 4:
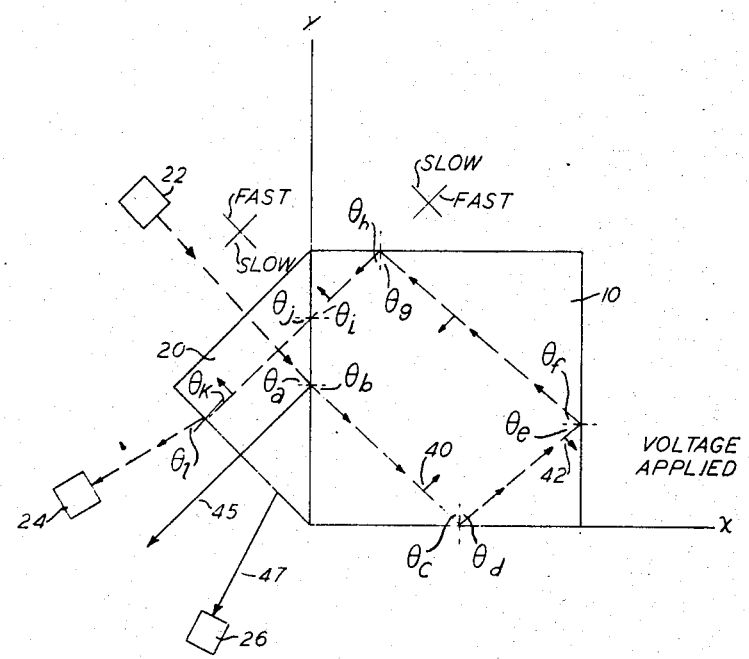
FIG. 4 represents an illustrative arrangement made in accordance with the principles of the present invention and denotes in exaggerated fashion the path traversed by an incident light beam.

In the FIG. 4 configuration, electrodes are assumed to be arranged in contact with those faces of the block 10 and the prism 20 which are parallel to the plane of the $x$ and $y$ axes. As a result of an electrical potential applied between such electrodes, the indicated fast and slow axes appear in the elements 10 and 20. A light beam emitted by the source 22 travels in a straight line parallel to a fast axis of the prism 20 until it reaches the interface between the prism 20 and the block 10. During its immediately subsequent transit through the block 10 the beam travels substantially parallel to a slow axis thereof. In other words, the index of refraction characteristic of the path of the beam in the prism 20 is different from the index characteristic of the beam path in the block 10. Hence, refraction occurs across the noted interface.

The direction of the deflection to which the incident beam is subjected as it crosses the interface between the elements 10 and 20 shown in FIG. 4 can be determined from the following equality:

$$(n_0 - n_0\delta)\sin\theta_a = (n_0 + n_0\delta)\sin\theta_b \qquad (2)$$

Clearly, $\theta_a$ must be larger than $\theta_b$, which means in effect that the beam is deflected upward, in the direction of small arrow 40, as a result of the noted interface refraction.

Subsequently, the beam represented in FIG. 4 undergoes a reflection at the boundary between the bottom face of the block 10 and its surrounding medium. In proceeding to this boundary the beam travels substantially parallel to a slow axis of the block 10. However, after reflection from this boundary the beam propagates substantially parallel to a fast axis of the block 10. The relationship between the angles of incidence and reflection at this boundary may be expressed as follows:

$$(n_0 + n_0\delta)\sin\theta_c = (n_0 - n_0\delta)\sin\theta_d \qquad (3)$$

It is clear from 3 that $\theta_d$ must be greater than $\theta_c$, which means in effect that the beam is deflected in the direction of small arrow 42.

The two deflections represented by the arrows 40 and 42 of FIG. 4 are additive in the sense that each causes the beam to follow a flatter trajectory (greater angles of incidence and reflection) with respect to the $x$ axis than the beam would follow in the absence of an applied field.

In a manner exactly similar to that specified above in connection with the formation of Equations 2 and 3, it may easily be verified that the following angular relationships are definitive of the beam path through the elements 10 and 20 shown in FIG. 4: $\theta_e > \theta_f$, $\theta_h > \theta_g$, $\theta_i > \theta_j$ and $\theta_l > \theta_k$. In each case small arrows perpendicular to the beam trace indicate the direction of the resulting deflection.

The successive reflections and refractions indicated in FIG. 4 are additive in their effect and deflect the beam that emerges from the exit face of the prism 20 through the angle $\theta_1$ which is measured relative to a normal to that face. Thus, it is seen that the emergent beam has been displaced along the exit face and angularly deflected with respect to the no-voltage beam path 45. Illustratively, the magnitude and polarity of the applied control voltage can be selected to cause the beam to impinge upon the receiver 24. Alternatively, by applying to the structure a control voltage of this same magnitude but of the opposite polarity, the emergent beam can be selectively directed along a path 47 to the receiver 26.

Figure 5:
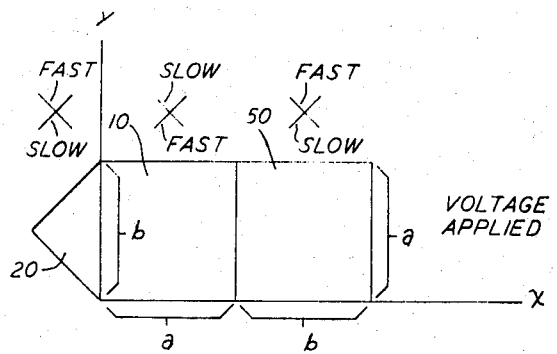
FIG. 5 shows the manner in which adjacent blocks are oriented in accordance with the principles of the present invention.

FIG. 5 depicts an illustrative deflection apparatus that embodies the principles of the present invention. The apparatus comprises the previously-described prism 20 and block 10 and, in addition, includes another block 50 which may be identical to the element 10. However, as shown in the figure, the block 50 is rotated 90° about the z axis with respect to the orientation of the block 10. Because of this relative rotation, the fast and slow axes in the two blocks 10 and 50 are seen to be respectively interchanged. As a result, a propagating beam is refracted as it crosses the interface between the prism 20 and the block 10, in the manner described above, and, additionally, is further refracted as it crosses the interface between the elements 10 and 50. Again, all reflections and refractions are additive in their effect in deflecting the propagation vector of the incident beam.

Figure 6:
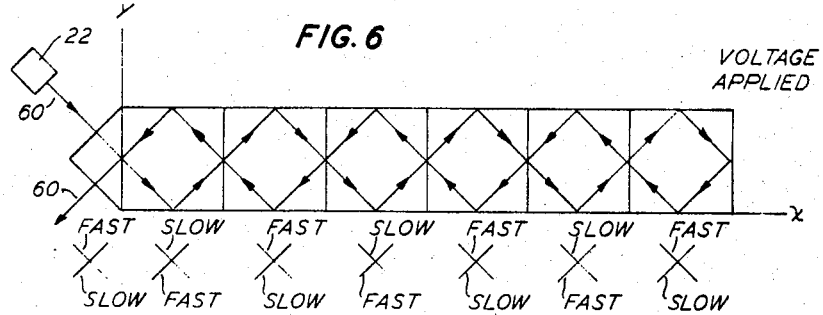
FIGS. 6 and 7 illustrate a specific multiblock deflection apparatus made in accordance with the teachings of this invention.

A plurality of identical electro-optic blocks each of the type of the block 10 considered above may be combined to form a multiblock array, as illustrated in FIG. 6. Each of these blocks is rotated 90° about the z axis with respect to its adjacent blocks, whereby in the presence of an applied electric field the fast and slow axes in successive blocks are respectively interchanged, as indicated in FIG. 6. The path traversed by the incident light beam as it propagates through the blocks and their associated prism is approximated by the trace 60 of FIG. 6. In the interest of simplicity and clarity of presentation, the actual deflections which occur at the various reflecting boundaries and across the interfaces of the array of FIG. 6 are not specifically shown therein. It is to be understood, however, that each of these deflections is of the type discussed above in connection with FIG. 4 and can be exactly determined by the same type of construction considered in connection with FIG. 4.

Figure 7:
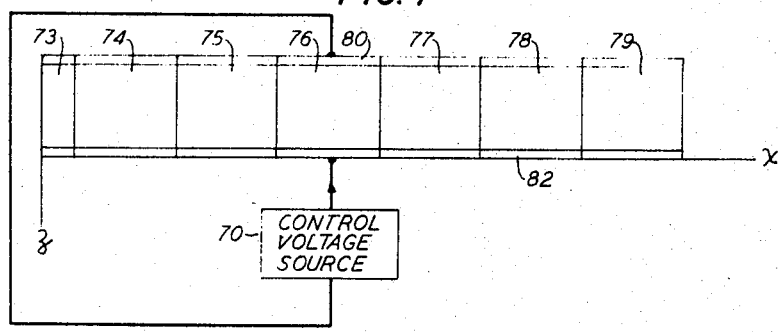

FIG. 7 is a top view of a specific illustrative embodiment of the principles of the present invention. The depicted apparatus includes a control voltage source 70, a prism 73 and six identical electro-optic blocks 74 through 79. Two electrodes 80 and 82 span opposite faces of the apparatus and are connected by electrical leads to the source 70. Illustratively, the elements 73 through 79 may be bonded together by any well known optical cement to form an integral deflection apparatus. Illustratively, the electrodes 80 and 82 may be contacted to the indicated faces of the deflection apparatus to effect good electrical contact therewith by evaporating a layer of gold on each electrode and pressing the electrodes to the deflection apparatus.

Figure 8:
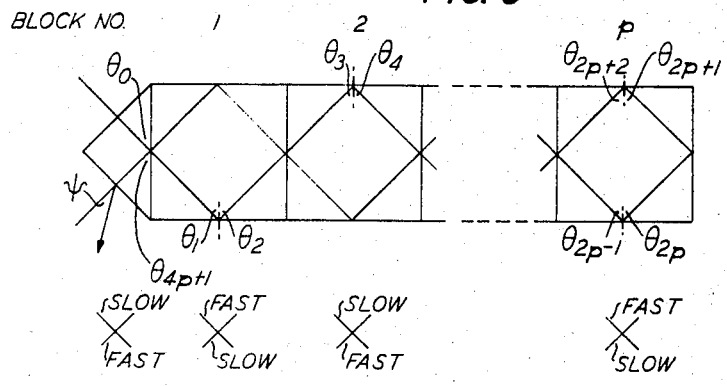
FIG. 8 depicts a p-block array which embodies the principles of the present invention.

The magnitude of the additive reflections and refractions considered herein can be computed in connection with the illustrative apparatus shown in FIG. 8. For the case wherein $\theta_0$ is 45° or $\pi/4$ radians, the following set of equalities defines the various reflections and refractions which occur in the depicted array:

$$(n_0+n_0\delta) \cos \theta_0 = (n_0-n_0\delta) \cos \theta_1$$
$$(n_0+n_0\delta) \sin \theta_2 = (n_0-n_0\delta) \sin \theta_1$$
$$(n_0+n_0\delta) \cos \theta_2 = (n_0-n_0\delta) \cos \theta_3$$
$$(n_0+n_0\delta) \sin \theta_4 = (n_0-n_0\delta) \sin \theta_3$$
$$\vdots$$
$$(n_0+n_0\delta) \sin \theta_{4p} = (n_0-n_0\delta) \sin \theta_{4p-1} \quad (4)$$
$$(n_0+n_0\delta) \cos \theta_{4p} = (n_0-n_0\delta) \cos \theta_{4p+1}$$
$$\sin \Psi = (n_0-n_0\delta) \sin (\theta_0-\theta_{4p+1})$$

By squaring each equation except the last one of the set (4) and then summing the squares, the following relationship is obtained:

$$(n_0+n_0\delta)^2(2p+\tfrac{1}{2}) = (n_0-n_0\delta)^2(2p+\cos^2 \theta_{4p+1}) \quad (5)$$

Since $\delta$ is much less than 1, and $$\theta_{4p+1} = \frac{\pi}{4} - \chi \quad (6)$$

where $\chi$ is linearly proportional to the applied electric field and is much less than $\pi/2$, we have $$(n_0 \pm n_0\delta)^2 \cong n_0^2(1 \pm 2\delta) \quad (7)$$

and $$\cos^2 \theta_{4p+1} \cong \left[\frac{1}{\sqrt{2}}(1+\chi)\right]^2 \cong \frac{1}{2}(1+2\chi) \quad (8)$$

Therefore $$\tfrac{1}{2}(1+2\chi) \cong -2p + \left(2p+\tfrac{1}{2}\right)(1+4\delta) = \tfrac{1}{2} + 8p\delta\left(1+\tfrac{1}{4p}\right) \quad (9)$$

Hence $$\chi \cong 8p\delta\left(1+\frac{1}{4p}\right) \quad (10)$$

Further, the last equation of the set (4) yields, to the lowest order in small quantities, $$\Psi = n_0 \chi \quad (11)$$

The net angular deflection is thus approximated by the expression $$\Psi = 8pn_0\delta \quad (12)$$

As mentioned above, successive alternation of fast and slow axes in adjacent electro-optic blocks may be achieved by rotating alternate blocks 90° about the z axis. Alternatively, the polarity of the voltage applied to each block may be made opposite to the polarity of the voltage applied to the blocks adjacent thereto, whereby the orientation of fast and slow axes in successive blocks is also thereby interchanged.

Although emphasis herein has been directed to deflection apparatus including an associated prism made of a linear electro-optic material, it is to be understood that the prism need not be electro-optic in nature. Furthermore, the prism need not even be included in illustrative embodiments of the present invention. Instead, an incident light beam can be aimed directly at a specified face of one of the cuboidal blocks described herein. For example, referring to FIG. 1, the beam can be directed at either one of the faces of the block 10 that is parallel to the plane defined by the y and z axes.

In addition, it is to be understood that the principles of the present invention are not limited to the selective deflection of light beams. Any incident radiation within the electromagnetic spectrum can in principle be deflected in the manner described herein.

Moreover, although primary emphasis herein has been directed to linear electro-optic materials, it is to be understood that the principles of this invention also extend to devices which are made of quadratic electro-optic materials. In such devices deflection is a quadratic function of the applied control voltage. Alternatively, such devices can be quiescently biased so that a superimposed control voltage produces a linear variation in deflection.

Finally, it is to be understood that the above-described arrangements are only illustrative of the application of the principles of the present invention. In accordance with these principles numerous other arrangements may be devised by those skilled in the art without departing from the spirit and scope of the invention. For example, the incident radiation need not be totally polarized in the x-y plane. However, the radiation must have a polarization component in the x-y plane. In that case what is deflected is that portion of the beam which corresponds to the x-y polarization component.

What is claimed is:

1. Apparatus disposed with respect to reference $x$, $y$ and $z$ axes for deflecting incident radiant energy, comprising a multifaced single-crystal block of electro-optic material which is characterized, in the absence of an applied electric field, by equal indices of refraction for radiant energy propagated along the bisectors of the 90° angles between said reference $x$ and $y$ axes and further characterized, in the presence of an electric field applied to said block parallel to said $z$ axis, by different indices of refraction for radiant energy propagated along said bisectors, means for applying an electric potential between the two faces of the block that are parallel to the plane defined by the $x$ and $y$ axes, and means for directing radiant energy at said block at an angle of approximately 45° with respect to the $x$ and $y$ axes and for directing said energy within said block to follow a path that includes linear segments generally parallel to one of said bisectors and additional linear segments generally parallel to the other one of said bisectors.

2. Apparatus disposed with respect to reference $x$, $y$ and $z$ axes for deflecting incident radiant energy, comprising a multifaced single-crystal cuboidal block of electro-optic material having equal edges of the block parallel to the $x$ and $y$ axes, means for applying an electric potential between the two faces of the block that are parallel to the plane defined by the $x$ and $y$ axes, and means for directing radiant energy at said block at an angle of approximately 45° with respect to the $x$ and $y$ axes and for directing said energy within said block to follow a path that includes linear segments generally parallel to one bisector of the 90° angles between said $x$ and $y$ axes and additional linear segments generally parallel to the other bisector of said $x$ and $y$ axes.

3. In combination, an electro-optic single-crystal element having an optic axis, said element being positioned with respect to reference $x$, $y$ and $z$ axes so that said optic axis is parallel to said reference $z$ axis, said element including two opposed faces perpendicular to said $z$ axis, means connected to said opposed faces for applying a potential therebetween to establish in said element an electric field parallel to said $z$ axis, and means for directing radiant energy at said element perpendicular to said $z$ axis and at approximately 45° with respect to said $x$ and $y$ axes and for directing said energy within said block to follow a path that includes linear segments generally parallel to one bisector of the 90° angles between said $x$ and $y$ axes and additional linear segments generally parallel to the other bisector of said $x$ and $y$ axis.

4. A combination as in claim 3 wherein said element is a block of material selected from the crystal classes consisting of Tetragonal; $\overline{4}2m$ and Cubic; 23 and $\overline{4}3m$.

5. A combination as in claim 3 wherein said element is a cuboidal block of potassium dihydrogen phosphate.

6. A combination as in claim 5 wherein said block comprises a zero degree z-cut crystal.

7. Apparatus for deflecting incident radiant energy, comprising a uniaxial single crystal of linear electro-optic material disposed with respect to reference $x$, $y$ and $z$ axes and having its optic axis oriented parallel to said $z$ axis, said crystal having a first set of opposed faces perpendicular to said $z$ axis, a second set of opposed faces perpendicular to said $x$ axis, and a third set of opposed faces perpendicular to said $y$ axis, a prism affixed to one face of said second set, said prism having entry and exit faces, and two electrodes respectively affixed to the opposed faces of said first set.

8. Apparatus as in claim 7 further including a control voltage source connected to said electrodes for establishing an electric field within said crystal parallel to the $z$ axis.

9. Apparatus as in claim 8 still further including means for directing an incident beam of collimated radiant energy at the entry face of said prism perpendicular to said $z$ axis and at 45° to said $x$ and $y$ axes, said beam having a polarization component in the plane defined by said $x$ and $y$ axes.

10. Apparatus as in claim 9 still further including means for receiving radiant energy emitted by said apparatus via the exit face of said prism.

11. In combination, two blocks of linear electro-optic material each oriented with respect to reference $x$, $y$ and $z$ axes, each of said blocks having an optic axis disposed parallel to said $z$ axis, each of said blocks further having two opposed faces perpendicular to said $z$ axis and two additional pairs of opposed faces perpendicular to said $x$ and $y$ axes, one of said additional opposed faces of one block being in contact with one of said additional opposed faces of the other block, said blocks being rotated with respect to each other by 90° about said $z$ axis, and two electrodes respectively connected to said first-mentioned opposed faces.

12. A combination as in claim 11 further including control voltage means connected to said electrodes for establishing within said blocks fast and slow phase velocity axes.

13. A combination as in claim 12 still further including means for directing radiant energy at the other one of said additional opposed faces of said one block and perpendicular to said $z$ axis at an angle of approximately 45° with respect to said $x$ and $y$ axes.

14. Deflection apparatus comprising an elongated array of $p$ blocks each oriented with respect to a set of reference $x$, $y$ and $z$ axes, each of said blocks being of a linear electro-optic material and having an optic axis disposed parallel to said $z$ axis and further having two pairs of opposed faces perpendicular to said $x$ and $y$ axes, each of said blocks except the first and last ones of said elongated array having said opposed faces thereof in contacting relationship with opposed faces of adjacent blocks, each of said first and last blocks having one of the opposed faces thereof in contacting relationship with one of the opposed faces of the block adjacent thereto, each of said blocks being rotated by 90° about the $z$ axis with respect to its adjacent blocks, means for establishing in successive alternation in said blocks fast and slow phase velocity axes disposed at approximately 45° with respect to said $x$ and $y$ axes, and means for directing a collimated beam of radiant energy at the other one of the opposed faces of said first block at an angle of approximately 45° relative to said $x$ and $y$ axes.

15. A combination as in claim 14 wherein each of said blocks further includes two additional opposed faces perpendicular to said $z$ axis and wherein said establishing means includes a control voltage source connected to electrodes which are in contact with said additional opposed faces.

References Cited

UNITED STATES PATENTS 3,295,912    1/1967    Fleisher et al. _____ 350—150
3,027,806    4/1962    Koelsch et al. _____ 350—150

FOREIGN PATENTS 690,467    12/1950    Great Britain.

DAVID SCHONEBERG, *Primary Examiner.*

P. R. MILLER, *Assistant Examiner.*

U.S. Cl. X.R.

350—157, 160